United States Patent Office 3,425,770
Patented Feb. 4, 1969

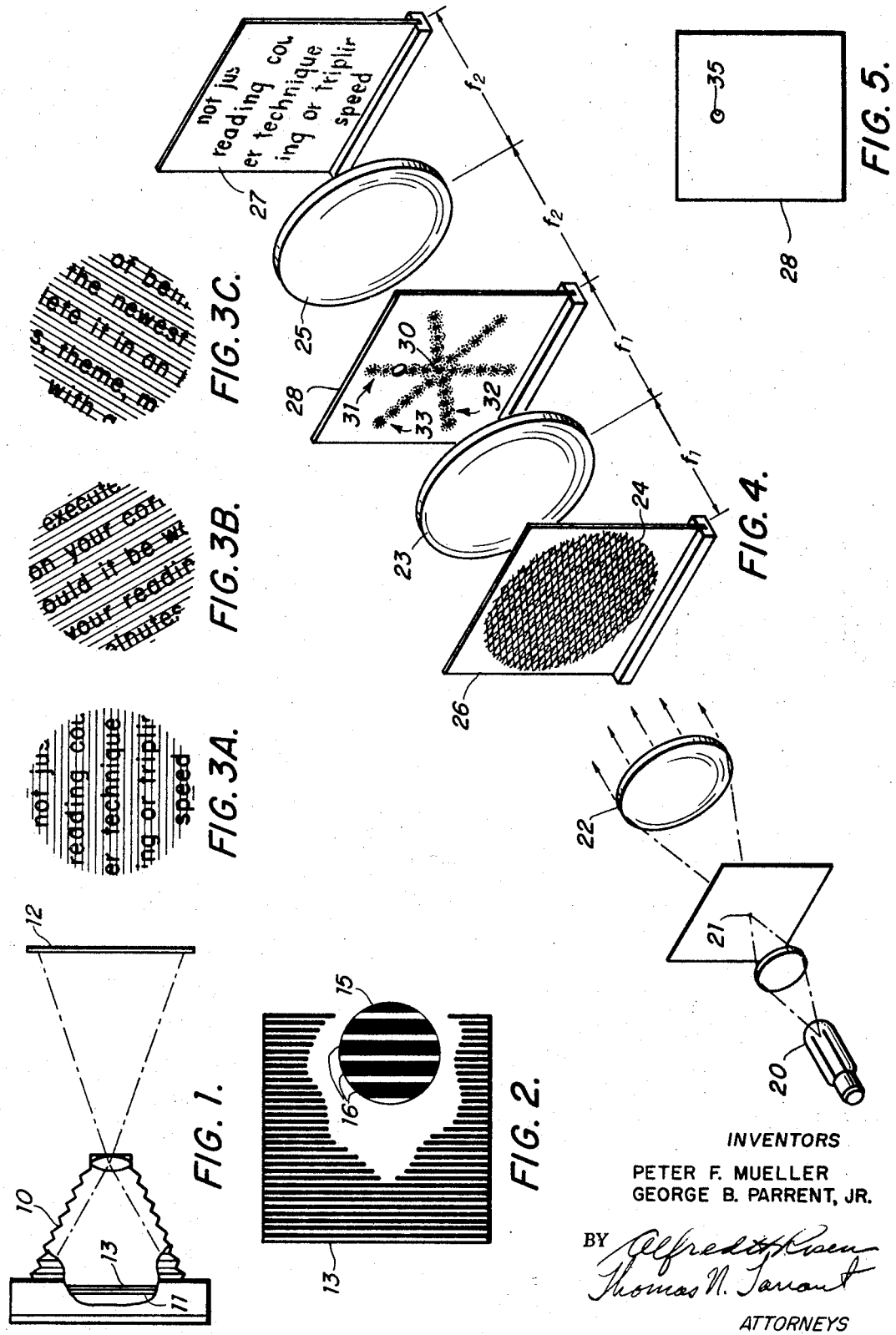

3,425,770
SUPERIMPOSED PHOTOSTORAGE AND
SEPARATION
Peter F. Mueller, Concord, and George B. Parrent, Jr.,
Carlisle, Mass.; said Mueller assignor to Technical
Operations, Incorporated, Burlington, Mass., a corporation of Delaware
Filed Dec. 1, 1965, Ser. No. 510,807
U.S. Cl. 350—162        8 Claims
Int. Cl. G02b 5/18

ABSTRACT OF THE DISCLOSURE

Photostorage method and system for additively recording a plurality of images in superposition upon a recording medium. Each of the images is multiplied with a periodic carrier function having a unique azimuthal orientation. Selective retrieval of the images is accomplished by optical Fourier transformation and spatial filtering techniques.

---

A photostorage medium for purposes of this invention is defined as a medium which, at least for a period of time, is sensitive to light such that an image of light intensity variation can be impressed upon the medium and will be retained thereby in some form for an extended period of time. Photographic and electrophotographic films and plates are exemplary.

There has been considerable knowledge for many years of diffraction gratings made up of alternating opaque and transparent lines used to produce diffraction patterns in which the interference of light will produce a sequence of light and dark areas related to the period of the grating. The light areas are called diffraction orders of the grating.

It is well recognized that most types of photostorage material such as microfilm, for example, are capable of storing a good deal more information density over a given surface area than is usually the case. Since information is recorded on film in vast quantities today the cost of film and processing has become substantial and storage space even for microfilm is not insignificant. The present invention provides a practical system for increasing storage density in photostorage materials.

With the birth of the laser an awakening of interest in the field of coherent light has produced great advances in the knowledge of light diffraction, how it operates, and what advantages can be obtained from it.

If a diffraction grating is positioned in the front focal plane of a lens and is illuminated by collimated light from a point source, the diffraction pattern in the back focal plane of the lens (called the Fourier transform plane) will appear as a series of dots extending in a line perpendicular to the lines of the grating about the optical axis. If the grating is rotated in a plane transverse to the optical axis, the line of dots is rotated with the grating so as to maintain this perpendicular relationship. Thus it can be seen that light passing through a diffraction grating will occupy positions in the transform plane that will be different for different angular positions of the grating.

If an object, such as a photographic transparency, is placed in the position of the grating described above a diffraction pattern of the object will appear in the transform plane any portion of which carries information of the entire object. Now if the grating and the object are superimposed in the front focal plane of the lens, a diffraction pattern of the grating convolved with the object spectrum appears in the transform plane. Thus at each diffraction order of the grating, an object spectrum is found. A second lens can be placed its own focal length beyond the transform plane described above and it will retransform the diffraction pattern back to any image of the superimposed object and grating. If this image is displayed on a screen in the back focal plane of the second lens, an opaque mask positioned in the transform plane and having transparent apertures passing the diffraction orders and large enough to pass the object spectrum centered at each order will have no effect on the displayed image. Also it can be understood that if this mask passes only one of the diffraction orders (i.e. one object spectrum) it will show an image of the object without the grating displayed. This happens because the spacing of the diffraction orders is related to the grating periodicity and when only one order is passed the period information is lost.

The mask placed in the transform plane is technically described as a "spatial filter." A spatial filter may be defined as an object placed in the Fourier transform plane of an optical system for modifying amplitude and/or phase of selected spatial frequencies. In the present invention this "modifying" is a blocking by absorption or reflection of all but selected diffraction orders along selected radii in the transform plane.

Assuming that the grating described above had vertical lines and that a second image multiplied with a second grating was positioned in the front focal plane of the first lens with the grating lines rotated 45° from vertical, the second image spectrum could not get through the mask in the transform plane which had been arranged to pass only diffraction orders above the zero order of a vertical grating. If the mask is rotated 45° in the proper direction an image of the second object can get through.

To some extent these things have been recognized in the art. An article by Armitage and Lohmann entitled, "Theta Modulation in Optics," has been published in Applied Optics, April 1965, pages 399 to 403. Armitage and Lohmann in their article describe various complex ways of breaking up an image into separate portions related to the angle of a diffraction grating pattern over each of the separate portions.

In accordance with the present invention it has been found that a plurality of images can be stored in a photostorage member each being periodically modulated in a manner which makes it possible to separate them out one from the other by simple and practical optical means. In general this can be done by exposing a plurality of objects sequentially, each through an amplitude diffraction grating to the same area of a photostorage medium, the grating through which the exposure for each object is made having an unique angle of orientation. Separation of the images, one from the other, has been accomplished with the aid of a spatial filter in a transform plane of a partially coherent optical system where the diffraction spectra of all of the images are convolved each with a diffraction order of its respective grating.

For objects of only two density levels the invention is carried out by exposing a photostorage medium in a conventional photographic manner to a first object with a superimposed diffraction grating, and then exposing the same area of the photostorage medium to a second object with a superimposed diffraction grating with the lines of the grating oriented at a different angle of rotation about the exposure axis in a plane transverse to the exposure axis. Further exposures to additional objects are made with the superimposed grating having its lines oriented at a different angle in a plane transversed to the exposure axis for each exposure. Separation of the images, one from the other, for recording or display is performed in a partially coherent light optical system arranged in the manner previously described with a mask in the transform plane having at least one aperture angularly positioned about the system's optical axis to pass a diffraction order of the grating convolved with the object spectrum which is to be imaged. This same form of readout is used in each embodiment of the invention but the manner of making the exposures and processing after exposure varies according to the characteristics of the objects.

A second general embodiment of the invention processes the recorded images so that the amplitude transmission in the stored image is linearly proportional to the input intensity in recording the image. Thus it is an object of the invention to define as an article, a photostorage medium carrying a plurality of superimposed images stored thereon in a novel arrangement.

It is a further object of the invention to define a novel method of storing a plurality of images.

It is a further object of the invention to define a novel method of photographic processing to obtain a recording that will yield an amplitude transmission linearly proportional to input intensity.

It is a further object of the invention to define apparatus for selectively displaying a plurality of superimposed stored images.

It is still a further object of the invention to define an optical system for photographically storing a plurality of superimposed images and for selectively reading them out.

Further objects and features of the present invention will become apparent upon reading the following specification together with the drawings in which:

FIG. 1 is a diagrammatic illustration of a camera system for making exposures in accordance with the invention;

FIG. 2 illustrates a diffraction grating for use in the present invention;

FIG. 3 illustrates a sequence of three exposures made in accordance with an embodiment of the invention;

FIG. 4 is a projection of a coherent optical system for readout of images stored in accordance with the invention;

FIG. 5 illustrates a spatial filter for use in the transform plane of the optical system of FIG. 4;

Figure 7:
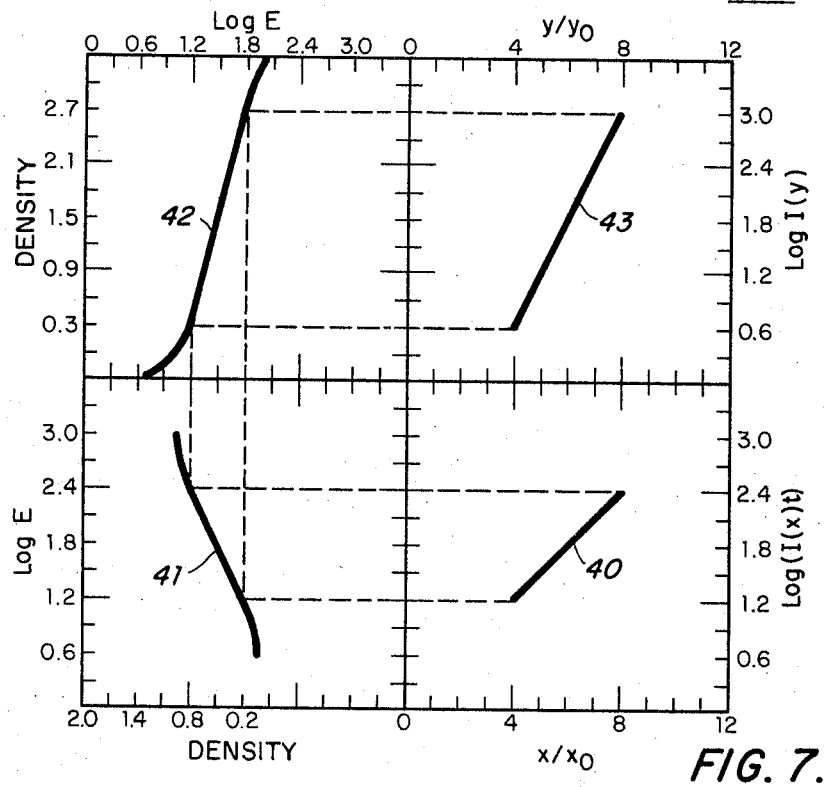
FIG. 7 is a graphical illustration of double negative processing to obtain the results of the reversal processing of FIG. 6.

In each embodiment of the present invention, photographic exposures are made in a fairly straightforward conventional manner. Illumination from any source normally used for photography is suitable; however, as will be seen, some distinctions will be made in the type of photographic material used and in the use of screens and gratings.

FIG. 1 depicts a camera 10 containing a photographic plate 11. An object 12 to be photographed could be, for example, a printed page. It can also be any usual subject of photography. In accordance with the invention photographic plate 11 is exposed to diffraction grating 13 multiplied with the object. When the object is a printed page or similar two-dimensional article, grating 13 may be positioned immediately adjacent to object 12. Grating 13 can also be positioned immediately adjacent to photographic plate 11 as depicted in FIG. 1, or object 12 and grating 13 can be optically multiplied so that they are imaged at photographic plate 11 as a product. For purposes of the invention it is critical that the grating and the object be imaged on the photostorage member as a product and not as a sum. Since it is desirable to limit the image resolution to a frequency less than that of the grating, it is sometimes preferable to position the grating adjacent to the film. This permits using the camera itself to limit the resolution of the image. Image resolution can be limited by stopping the camera lens down, by defocusing or by introducing a grained filter.

Diffraction grating 13 is illustrated in greater detail in FIG. 2. Diffraction grating 13 is an amplitude grating of periodic opaque and transparent bars. An amplitude grating is defined as one that alters the amplitude with no substantial alteration in the phase of an incident wave. However, since the gratings in the present invention are used in incoherent light, they function to alter intensity. Amplitude as used herein and generally in physical optics is a wave characteristic not accurately applicable to incoherent light. Thus the amplitude gratings used herein would alter amplitude of coherent light, but in fact alter intensity in the incoherent exposures. A diffraction grating is defined as a device that imposes, on an incident wave, a periodic variation of amplitude, phase or both. A small section 15 of grating 13 is illustrated greatly enlarged for descriptive purposes. Referring to enlarged portion 15, black bars 16 are opaque while the narrow bars between them are transparent. A period of the grating is the width of one transparent bar plus the width of one opaque bar.

Perhaps the most common diffraction gratings are called "Ronchi rulings" in which the width of the opaque bars and the transparent bars is identical. While Ronchi rulings are operative in the present invention, it has been found preferable to use opaque bars that are wider than the transparent bars as illustrated in enlarged portion 15.

The relatively narrow transport bars leave more virgin film for additional exposures and also spread the single aperture envelope limitation on the grating diffraction orders.

The simplest type of object to store photographically is a binary object. Binary is used here to mean an object having only two density levels, for example, a printed page of black on white. Color makes no difference but there should be only two density levels as seen by the photographic material. In practice this condition can be enhanced by using a suitable photographic film and processing to a high gamma. Gamma is used conventionally to mean the slope of the straight line portion of the density versus log exposure curve.

FIG. 3 illustrates three exposures of printed pages each with a grating superimposed. The grating spatial frequency should be at least twice the image spatial bandwidth. Thus in one example the highest frequency to be resolved was 6 line pairs per millimeter and the grating frequency was 12 lines per millimeter. A photostorage medium (e.g. photographic plate 11) was exposed to a first printed page with the grating 13 lines horizontal, as depicted in FIG. 3A. While this figure schematically shows the grating lines crossing the image of the text, it will be understood that where the opaque bars 16 cross the letters of the text the image of the letter is interrupted; that is, the photographic image of the text is made only where the transparent bars are located, and the modulation of the image due to the grating is spatially distributed throughout the image. Exposure was then made on the same area of the photostorage medium to a second printed object with the grating rotated 60° as illustrated in FIG. 3B, and an exposure was made of a third printed object with the grating rotated an additional 60° as illustrated in FIG. 3C. The film used in the particular example shown was a Kodalith Ortho plate having a normal gamma greater than 4. "Kodalith" is a trademark of Eastman Kodak Company, Rochester, N.Y. The photographic plate was processed normally, obtaining three recorded superimposed images as schematically illustrated in transparency 24 in FIG. 4 supported in frame 26.

Transparency 24 represents the composite developed photographic transparency made from exposing a photosensitive member to the three exposures illustrated in FIGS. 3A, 3B, and 3C. Only the grating modulation lines at the three different angles have actually been drawn in the depicted transparency. Transparency 24 is nonetheless to be taken as containing original objects information as well as grating information. It should be noted that the Kodalith Ortho plate as well as other photostorage media used for the present invention generally have only one photosensitive storage layer. Thus the three superimposed images are additively mixed in the same area of the same photostorage layer, and their respective modulations are each spatially distributed substantially throughout the layer.

As can be seen in FIG. 4a photograph 24 containing several superimposed images may not be readily legible to the eye, but is of an advantage for increasing storage density. When it is desired to view these stored images individually they may be separated out from one another, and recorded separately as on a new photosensitive member, or merely displayed in some form of viewer.

FIG. 4 illustrates diagrammatically an optical system for viewing or recording separately one of several images that are superimposed as described above. FIG. 4 illustrates a partially coherent optical system comprising a light source 20, pin hole aperture 21, collimating lens 22, converging lenses 23 and 25 separated by the sum of their focal lengths $f_1$ and $f_2$, frame means 26 for supporting an object, and a support means 27 for supporting a photosensitive medium or display screen. A spatial filter 28 is also shown between the lenses, in the back focal plane of lens 23 and the front focal plane of lens 25. For simplicity of illustration, the spatial filter 28 is depicted as in a fixed support. Nevertheless, it is to be understood that the spatial filter will generally be mounted so that it may be rotated in a plane transverse to the optical axis of the system. Fixed filters such as the one shown would be replaced with filters having apertures at other fixed locations for passing diffraction spectra of other images.

For purposes of the invention light source 20 should be an intense light source and an arc lamp or laser will be suitable. A mercury arc lamp was used in carrying out the examples described herein. The light source need give rise to field illumination which is coherent over only a few periods of the grating modulation in the stored images in the transparency 24. This is the means of the term "partially coherent" as used herein.

The pin hole aperture 21 is used to increase the coherency of the light and collimating lens 22 following the aperture provides a collimated beam of a selected diameter. With a collimated beam the distance between the collimator and the rest of the system becomes noncritical. With an uncollimated beam magnification can be obtained.

The position of filter 28 in the back focal plane of lens 23 is called the Fourier transform plane. It can be seen that the collimated beam from collimating lens 22 will be brought to a point focus at the transform plane. If the beam is not collimated, the optical system must be arranged so that the beam is still brought to a focus at the transform plane. Further optics can also be used at the image end of the system for magnifying or reducing the size of the image.

Light from source 20 must be at least partially coherent at the illumination plane where an object supported in frame 26 is illuminated. The required degree of coherence is related to the object resolution, as is noted above. For purposes of the present invention the higher frequency in the object can be considered to be the grating frequency.

With photograph 24 (a transparency) positioned in frame 26 a diffraction pattern will appear in the transform plane. This diffraction pattern is depicted at filter 28 in FIG. 4. Collimated light that is undisturbed by the object will be focused to the center of the transform plane as a spot illustrated as the central illumination spot 30 at filter 28. This spot represents the zero order of each grating and is commonly called the DC spot. Since this spot is independent of grating orientation it will be common to all the images 24 superimposed in the object. One of the purposes of the spatial filter 28 is to block the DC spot. A vertical series of spots 31 represent diffraction orders of the horizontal grating related to the exposure of FIG. 3A. Extending out in both directions beyond the zero diffraction order are the first, second, third, fourth and fifth diffraction orders.

The diffraction orders 32 related to the exposure of FIG. 3B are in a line rotated 60° clockwise from the diffraction orders 31 and the diffraction orders 33 related to the exposure of FIG. 3C are in a line rotated 60° clockwise from the diffraction orders 32.

FIG. 4 shows only diffraction orders along the primary axes of diffraction. In practice, due mainly to nonlinearities in photographic processing, cross-products appear along axes parallel with the primary axes. In separating out any specific image undesirable interference from these cross-products is preferably minimized by selecting a primary diffraction order that has little interference from cross-products.

In the binary example described above readout was obtained by placing spatial filter 28 illustrated in FIG. 5 in the transform plane of FIG. 4. Filter 28 is opaque except at aperture 35. Aperture 35 is located to pass third order diffractions of the 12 lines per millimeter grating. By rotating filter 28 in the transform plane around the optic axis of the system, the aperture 35 can selectively pass one third order diffraction of each of the three exposures depicted in FIG. 3. The size of aperture 35 is determined to pass the complete third diffraction order convolved with the image spectrum.

An image of each of the FIG. 3 exposures was recorded at support 27 by positioning filter aperture 35 to pass a third diffraction order of each grating convolved with the object spectrum of the respective exposure. The recorded images obtained with a resolution of 6 lines per millimeter were highly legible.

Referring to FIG. 3 it will be noted that the printed lines in each exposure are rotated with respect to lines in the other exposures. This is done to minimize the number of points at which characters in two or more different exposures actually intercept one another. Although FIG. 3 depicts the printed lines as parallel with the grating lines in each exposure, this is only for simplicity of illustration. The printed lines can readily run at a different angle with respect to the respective grating in each exposure.

The amount of effective degradation for a given image resolution can always be reduced by increasing the grating frequency. It must be remembered however that the photo storage material used must always resolve the grating.

While more image light can be obtained at support 27 by passing more of the grating diffraction orders, this places additional burden on the optical system for obtaining exact image registration at the support plane. Passing other diffraction orders will also introduce fringes derived from the grating at the support plane, but with high frequency fringes or a low resolution recording material at support 27, the fringes can be made invisible.

Image degradation takes place as a result of cross-products in the transform plane. A second embodiment of the present invention reduces the effect of cross-products.

It has been found mathematically that the cross-products should be eliminated by making the amplitude transmission of the object transparency linearly proportional to the input intensity by which the exposures were made. To obtain this requires an analysis of the density versus log exposure curve for photographic material. A conventional equation for the intensity transmission of a photographic transparency is:

$T_I(x) = KI(x)^{-\gamma}$
where $K = 10^{-D_b}(t/E_0)^{-\gamma}$ the amplitude transmission for the transparency can be stated as:

$$T_A(x) = \sqrt{T_I(x)} = \sqrt{K} I(x)^{-\frac{\gamma}{2}}$$

$T_I(x)$ is the intensity transmission
$K$ is a constant
$I(x)$ is the intensity distribution of an image formed by uniformly illuminating a transparency γ is the slope of the density versus log exposure curve
$E(x)$ is the exposure impressed on the photographic material
$D_b$ is the base density of the photographic material
$t$ is time duration of exposure
$E_o$ is the threshold exposure required to produce a density increase above base density $D_b$.
$T_A(x)$ is the amplitude transmission.

The equation for amplitude transmission can be made linear with input intensity transmission by setting gamma equal to −2. It must be recognized however that for this to have any valid effect the gamma must also be constant. For example, it becomes essential that no image exposure be made in a nonlinear portion of the density versus log exposure curve.

In processing the images for a constant gamma of −2, it is necessary to relate this gamma to the coherent optical system. It has been found that measured density versus log exposure curves vary with the conditions of measurement. Thus curves measured with a densitometer, a microdensitometer, and in a coherent system are all different. These differences are apparently due to differences in diffuse and spectral density which in turn relate to the graininess of the photographic emulsion. For the present invention the gamma must be determined by measurement in a coherent optical system such as used to separate and display the images.

The following two examples illustrate specific methods that have been used in practicing the invention.

*Example 1*

Figure 6:
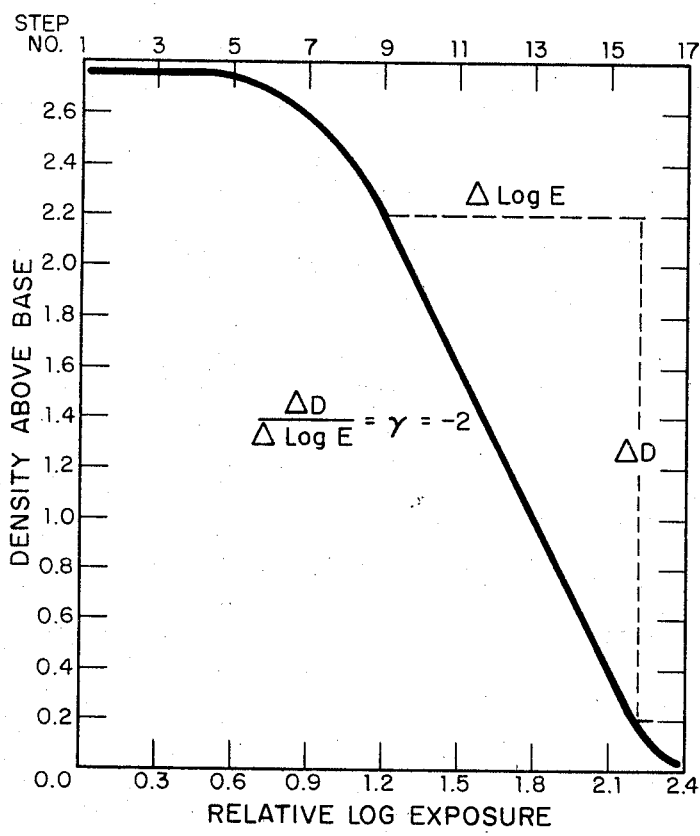
FIG. 6 is a graphical illustration of a density versus log exposure curve for reversal processing in accordance with a second embodiment of the invention.

Three exposures were made under the same conditions as set forth for the binary image storage previously described. The same 12 lines per millimeter grating was used and the objects had maximum spatial frequencies of 6 lines per millimeter. The photographic plate used in the camera had a reversal process density versus log exposure curve with a gamma of −2 as illustrated in FIG. 6. The plate was uniformly pre-exposed so that the object exposures fill in the straight portion of the exposure curve. The maximum total exposure was limited so that this also did not go beyond the straight line portion of the curve.

The three continuous tone images were read out separately in the coherent system of FIG. 4 with the spatial filter 28 passing one third order diffraction spectrum of each. The displayed images were very good quality with only the faintest ghosting of the other images observable upon close scrutiny.

*Example 2*

Exposures were made the same as in Example 1 but using a film normally processed to a gamma of one-half as shown by curve 41 in FIG. 7. Again the film was uniformly pre-exposed to eliminate the nonlinear foot of the exposure curve and the maximum exposure was also limited so as to remain in the straight line portion of the curve. This film was normally processed and then projection printed onto a high resolution plate having a normal process gamma of 4 as shown in curve 42 of FIG. 7. Again normal processing was used and the result was a transparency as shown in curve 43 having an intensity equal to the square of the input intensity as represented by curve 40. This transparency was displayed in the coherent system as before with similar results.

In recording images with amplitude linearly proportional to input intensity, it has been found that optical thickness variations in the recording medium (some introduced by processing) affect linearity and cause image degradation in readout. These variations are minimized by using what has been called a "liquid gate." A liquid with an index of refraction closely matching that of the recording medium is coated over one or both sides of the medium. When the recording medium has a substrate that maintains a surface free of variations only the free surface of the storage layer may be liquid coated. For most photographic emulsions, the liquid should have a refractive index of about 1.4 to 1.5. One suitable liquid is n-dibutyl phthalate. Xylene has also been used. Sandwiching the recording medium with glass so that the liquid coating is sandwiched between the two provides long term protection and stability for the liquid gate.

While the invention has been described in relation to specific embodiments, various modifications thereof will be apparent to those skilled in the art and it is intended to cover the invention broadly within the spirit and scope of the appended claims.

We claim:
1. A photostorage member comprising a storage medium, a plurality of different images superimposed in said medium, a spatially-distributed periodic modulation having a directional characteristic associated with and extending throughout each image in said medium, the modulation associated with any one image having a frequency at least twice the highest frequency resolved to the image and a spatially-distributed modulation characteristic different from that of the modulation associated with any other of said images.

2. A photostorage process comprising:
  (a) consecutively making a plurality of image exposures of a single area on a photostorage medium through an amplitude diffraction grating with the grating having a different angular orientation for each exposure to obtain a latent composite image;
  (b) processing said medium comprising developing said composite image;
  (c) placing said medium in an at least partially coherent optical system so as to form the spectrum of said composite image in a transform plane; and
  (d) positioning a spatial filter in said transform plane so as to separate an image corresponding to one of said plurality of exposures by selectively passing a diffraction order greater than zero of said grating as it was oriented during said one of said plurality of exposures along with the image spectrum centered in said order.

3. A photostorage process according to claim 2 in which said grating is positioned in contact with said member to make said exposure.

4. A photostorage process according to claim 2 in which said exposures are each to objects of only two intensity levels and said processing is to obtain a transparency of only two density levels.

5. A method of making a composite optical record comprising recording in additive superposition on a common area of a recording medium a plurality of different randomly varying record functions each of which is caused to be multiplied with a substantially periodic carrier function having a unique azimuthal orientation.

6. A photostorage member according to claim 5 in which at least one image is a continuous tone image.

7. A method of storage and optical retrieval of information comprising:
  (a) making a composite optical record by additively combining in effective registration a plurality of different randomly varying component record functions each of which is caused to be multiplied with a substantially periodic carrier function having a unique azimuthal orientation;
  (b) illuminating said record with a beam of radiation having at least partial coherence at the record;
  (c) forming in a Fourier transform space a diffraction pattern of the record comprising a corresponding plurality of Dirac delta function arrays having, respectively, angular orientations related to the direction vectors of said carrier functions, each delta function array being convolved with a spectrum of spatial frequencies characterizing a different one of the component record functions;

(d) selectively transmitting through said transform space at least one spectrum of spatial frequencies of at least one predetermined record function desired to be retrieved from said composite record; and (e) retransforming said transmitted spectra.

8. The method defined by claim 7 wherein said step of making said composite record comprises exposing a common area of photosensitive medium to a plurality of images representing said plurality of record functions while causing said images to be respectively multiplied with an amplitude grating of unique azimuthal orientation such that the total exposure of said area of said photosensitive medium represents an additive superposition of images respectively multiplied with an angularly unique carrier, and further comprises processing said photosensitive medium to a photographic transparency.

References Cited

UNITED STATES PATENTS

| 2,050,417 | 8/1936 | Bocca | 352—45 |
|---|---|---|---|
| 3,305,834 | 2/1967 | Cooper et al. | |
| 3,312,955 | 4/1967 | Lamberts et al. | |

OTHER REFERENCES

J. D. Armitage and A. W. Lohmann: Theta Modulation in Optics, April 1965 Applied Optics, pp. 399–403.

NORTON ANSHER, *Primary Examiner*

R. M. SHEER, *Assistant Examiner*.

U.S. Cl. X.R.

88—24; 352—40; 95—36

UNITED STATES PATENT OFFICE
CERTIFICATE OF CORRECTION

Patent No. 3,425,770                      February 4, 1969

Peter F. Mueller

It is certified that error appears in the above identified patent and that said Letters Patent are hereby corrected as shown below:

Column 8, lines 16 and 17, cancel "having a directional characteristic"; line 20, "to" should read -- in --.

Signed and sealed this 31st day of March 1970.

(SEAL)
Attest:

Edward M. Fletcher, Jr.                      WILLIAM E. SCHUYLER, JR.
Attesting Officer                              Commissioner of Patents